United States Patent
Vitanov et al.

(10) Patent No.: US 7,933,880 B2
(45) Date of Patent: Apr. 26, 2011

(54) SYSTEM AND METHOD OF APPLICATION PERSISTENCE

(75) Inventors: Kamen Vitanov, Mississauga (CA); Viera Bibr, Kilbride (CA); Michael Shenfield, Richmond Hill (CA); Bryan Goring, Milton (CA)

(73) Assignee: Research In Motion Limited, Waterloo, Ontario ( * ) Notice: Subject to any disclaimer, the term of this patent is extended or adjusted under 35 U.S.C. 154(b) by 410 days.

(21) Appl. No.: 11/405,576

(22) Filed: Apr. 18, 2006

(65) Prior Publication Data
US 2006/0262749 A1 Nov. 23, 2006

Related U.S. Application Data

(60) Provisional application No. 60/672,020, filed on Apr. 18, 2005.

(51) Int. Cl.
*G06F 7/00* (2006.01)
(52) U.S. Cl. ........................................ 707/702
(58) Field of Classification Search .................. 707/641, 707/102, 726
See application file for complete search history.

(56) References Cited

U.S. PATENT DOCUMENTS

| | | | |
|---|---|---|---|
| 5,530,801 A | | 6/1996 | Kobayashi |
| 5,862,452 A * | | 1/1999 | Cudak et al. .................... 725/81 |
| 6,105,148 A | | 8/2000 | Chung et al. |
| 6,708,288 B1 | | 3/2004 | Ziegler et al. |
| 2002/0068588 A1 | | 6/2002 | Yoshida et al. |
| 2002/0176378 A1 * | | 11/2002 | Hamilton et al. ............. 370/328 |
| 2003/0014521 A1 | | 1/2003 | Elson et al. |
| 2003/0050932 A1 | | 3/2003 | Pace et al. |
| 2003/0120811 A1 * | | 6/2003 | Hanson et al. ................ 709/245 |
| 2003/0188121 A1 * | | 10/2003 | Roy et al. ...................... 711/171 |
| 2004/0029638 A1 | | 2/2004 | Hytcheson et al. |
| 2004/0168028 A1 | | 8/2004 | Cierniak |
| 2004/0233930 A1 * | | 11/2004 | Colby, Jr. ...................... 370/464 |
| 2005/0058149 A1 | | 3/2005 | Howe |

FOREIGN PATENT DOCUMENTS

EP 1039721 3/2004

OTHER PUBLICATIONS

PCT International Search Report and Written Opinion mailed Aug. 11, 2006 for corresponding PCT Application No. PCT/CA2006/000582.

* cited by examiner

*Primary Examiner* — Pierre M Vital
*Assistant Examiner* — Truong V Vo
(74) *Attorney, Agent, or Firm* — Gowling Lafleur Henderson LLP

(57) ABSTRACT

An application persistence system for improving wireless application resource efficiency is provided. The application persistence system comprises a persistence-point definition module for defining conditions that trigger persisting application data, a persistence-point analysis module for identifying efficient and reliable persistence points and a persistence points enforcement module for enforcing persistence points at application runtime. A method of improving wireless application resource efficiency is also provided. The method comprises the steps of defining conditions that trigger persisting application data, identifying efficient and reliable persistence points, defining a persistence mode flag in an application's profile, and enforcing persistence points at application runtime.

8 Claims, 10 Drawing Sheets

SYSTEM AND METHOD OF APPLICATION PERSISTENCE

This non-provisional application claims the benefit of U.S. Provisional Application No. 60/672,020 filed Apr. 18, 2005, which is hereby incorporated by reference.

The present disclosure relates generally to a communications system for providing communications to a plurality of devices and specifically to a system and method of application persistence.

BACKGROUND OF THE INVENTION

Due to the proliferation of wireless networks, there are a continually increasing number of wireless devices in use today. These devices include mobile telephones, personal digital assistants (PDAs) with wireless communication capabilities, two-way pagers and the like. Concurrently with the increase of available wireless devices, software applications running on such devices have increased their utility. For example, the wireless device may include an application that retrieves a weather report for a list of desired cities or an application that allows a user to shop for groceries. These software applications take advantage of the ability to transmit data of the wireless network in order to provide timely and useful services to users, often in addition to voice communication. However, due to a plethora of different types of devices, restricted resources of some devices, and complexity of delivering large amounts of data to the devices, developing software applications remains a difficult and time-consuming task.

A wireless handheld device has limited battery power, memory and processing capacity. Since communication on a device is expensive in terms of energy consumption, it is desirable to minimize message traffic to and from the device as much as possible.

There are different approaches that provide a trade off between performance and reliability. These approaches target desktop computers. For example, desktop operating systems provide control over the frequency that cached data is saved on a non-volatile storage. Another example is when a word processing application provides an option regarding how often a document should be automatically saved by the application. Wireless devices are characterized by limited processing power and having control over performance requirements of an application is much more important than for desktop computers. There is a need for a way of improving the resource efficiency of a wireless application.

BRIEF DESCRIPTION OF THE DRAWINGS

An embodiment of the teachings of the disclosure will now be described by way of example only with reference to the following drawings in which.

DETAILED DESCRIPTION OF THE PREFERRED EMBODIMENT

Figure 1:
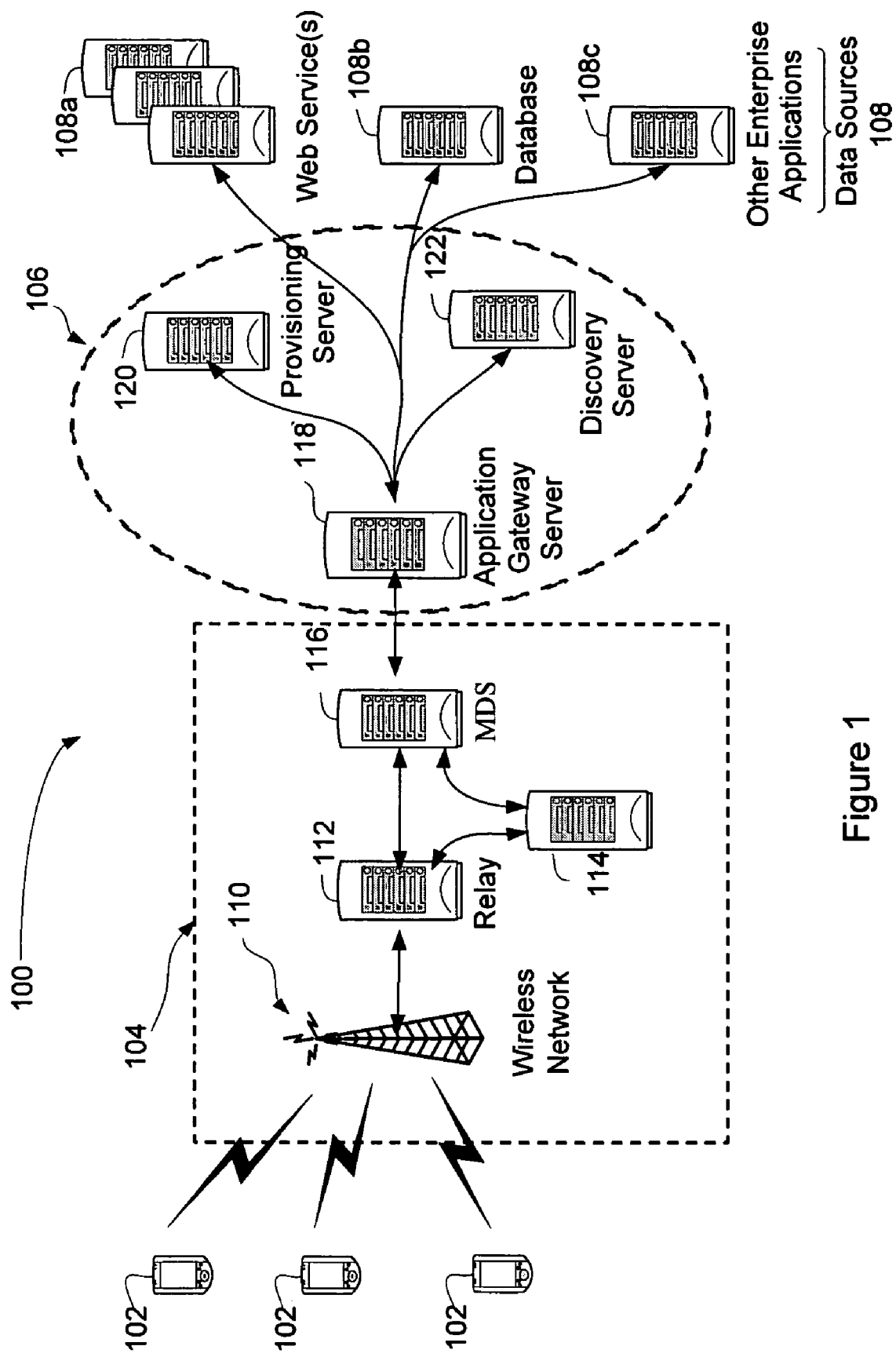
FIG. 1 is a schematic diagram of an example of a network facilitating wireless component applications.

The disclosure provides a mechanism for application persistence such that the resource efficiency of a wireless application is improved. In addition, the control over the persistence is enforced by an application container rather than by every individual application.

In accordance with an embodiment of the present disclosure, there is provided an application persistence system for improving resource efficiency of a wireless application. The application persistence system comprises a persistence-point definition module for defining conditions that trigger persisting application data, a persistence-point analysis module for identifying efficient and reliable persistence points, and a persistence-point enforcement module for enforcing persistence points at application runtime.

In accordance with another embodiment of the present disclosure, there is provided a method of improving wireless application resource efficiency. The method comprises the steps of defining conditions that trigger persisting application data, identifying efficient and reliable persistence points, defining a persistence mode flag in an application's profile, and enforcing persistence points at application runtime.

In accordance with another embodiment of the present disclosure, there is provided a computer-readable medium storing instructions or statements for use in the execution in a computer of a method of improving wireless application resource efficiency. The method comprises the steps of defining conditions that trigger persisting application data, identifying efficient and reliable persistence points, defining a persistence-mode flag in an application's profile and enforcing persistence points at application runtime.

In accordance with another embodiment of the present disclosure, there is provided a propagated signal carrier carrying signals containing computer-executable instructions that can be read and executed by a computer. The computer-executable instructions are used to execute a method of improving wireless application resource efficiency. The method comprises the steps of defining conditions that trigger persisting application data, identifying efficient and reliable persistence points, defining a persistence-mode flag in an application's profile and enforcing persistence points at application runtime.

Advantageously, the application persistence system and method optimize efficiency and reliability of wireless application device resources. Additional advantages include better user experience and battery life improvements.

A system and method of the present patent disclosure will now be described with reference to various examples of how the embodiments can best be made and used. For convenience, like reference numerals are used throughout the description and several views of the drawings to indicate like or corresponding parts, wherein the various elements are not necessarily drawn to scale.

Referring to FIG. 1, an example of communication infrastructure is illustrated generally by numeral 100. The communication infrastructure 100 comprises a plurality of wireless devices 102, a communication network 104, an application gateway 106, and a plurality of back-end services 108.

The wireless devices 102 include typical personal digital assistants (PDAs), and may include other types of devices. Each of the wireless devices 102 includes a runtime environment capable of hosting a plurality of component applications.

Component applications comprise one or more data components, presentation components, and/or message components, which are written in a structured definition language such as Extensible Markup Language (XML) code. The component applications can further comprise workflow components which contain a series of instructions such as instructions written in a subset of ECMAScript, and can be embedded in the XML code in some implementations. Therefore, since the applications are compartmentalized, a common application can be written for multiple devices by providing corresponding presentation components without having to rewrite the other components. Further, large portions of the responsibility of typical applications are transferred to the runtime environment for component application. The details of the component applications are described at the end of this description.

The wireless devices 102 are in communication with the application gateway 106 via the communication network 104. Accordingly, the communication network 104 may include several components such as a wireless network 110, a relay 112, a corporate server 114 and/or a mobile data server (MDS) 116 for relaying data between the wireless devices 102 and the application gateway 106.

The application gateway 106 comprises a gateway server 118, a provisioning server 120 and a discovery server 122. The gateway server 118 acts as a message broker between the runtime environment on the wireless devices 102 and the back-end services 108. The gateway server 118 is in communication with both the provisioning server 120 and the discovery server 122. The gateway server 110 is further in communication with a plurality of the back-end services 108, such as Web services 108*a*, database services 108*b*, as well as other enterprise services 108*c*, via a suitable link. For example, the gateway server 118 is connected with the Web services 108*a* and database services 108*b* via simple object access protocol (SOAP) and Java database connectivity (JDBC) respectively. Other types of back-end services 108 and their corresponding links can be connected to the gateway server 118.

Preferably, each wireless device 102 is initially provisioned with a service book or IT policy facility to establish various protocols and settings, including connectivity information for the corporate server 114 and/or the mobile data server 116. These parameters may include a uniform resource locator (URL) for the application gateway server 118 as well as its encryption key. Alternatively, if the wireless device 102 is not initially provisioned with the URL and encryption key, they may be pushed to the wireless device 102 via the mobile data server 116. The mobile device 102 can then connect with the application gateway 106 via the URL of the application gateway server 118.

Figure 2:
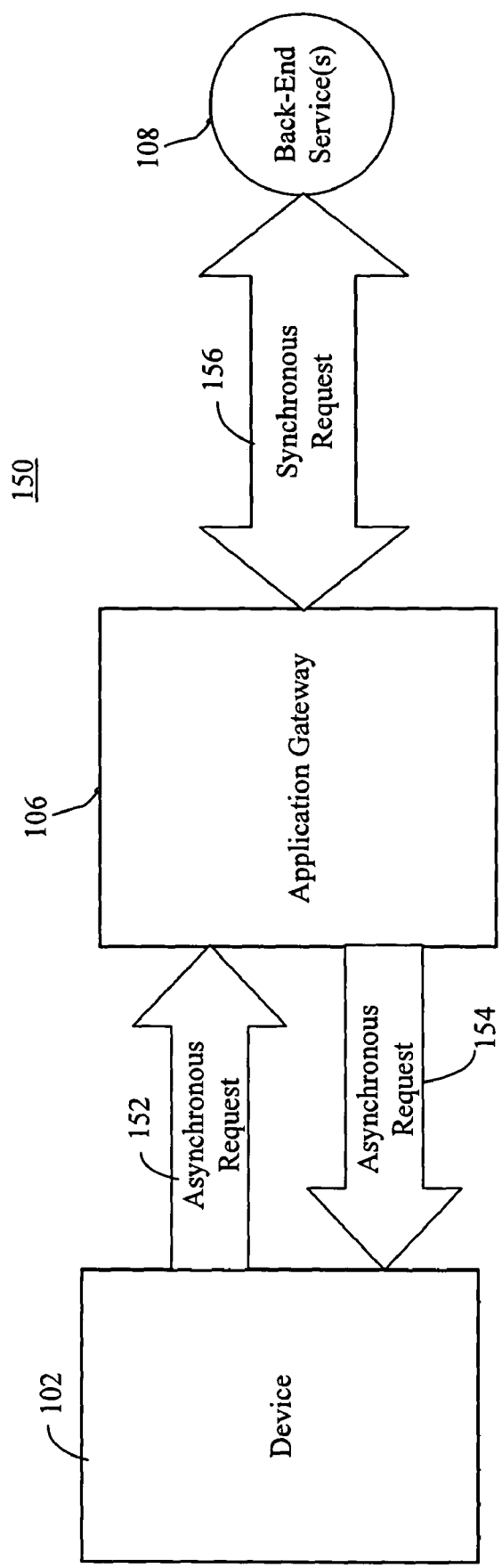
FIG. 2 shows in a flow diagram an example of a wireless component application communication model.

Referring to FIG. 2 there is illustrated in a block diagram an example of a wireless component application communication model 150. From a high-level perspective, the overall wireless component application infrastructure 150 includes a wireless component application runtime environment (device RE) running on the device 102 and a wireless component application gateway (AG) 106 running on the server 118.

The AG 106 serves as a mediator between a wireless component application (sometimes referred to as application in this disclosure) executed by the RE and one or more back-end services 108 with which the application communicates. Often the back-end service is expected to be a Web service 108*a* using SOAP over HTTP or HTTPS as the transport protocol. As Web services are the most commonly expected back-end service 108, the term Web service is used interchangeable with back-end service 108 throughout this disclosure. However, it is appreciated that other types of back-end services can also be adapted to the disclosure. FIG. 2 exemplifies a synchronous link with a back-end service 108. However, it should be appreciated that the AG 106 can be in communication with back-end services 108 over asynchronous links.

The wireless component application communication model 150 is based upon an asynchronous messaging paradigm. In this model the application gateway (AG) 106 establishes and mediates the connection between the device 102 and the back-end service(s) 108 to:

1. Achieve greater flexibility in resource management.
2. Provide reliable communication link between device 102 and back-end service 108 to handle situations when wireless coverage is unstable.
3. Efficiently distribute workload between device RE 102 and AG 106.
4. Provide a mechanism to mediate effective over-the-air (OTA) wireless messaging to typical wired network protocols (e.g., SOAP).

Figure 3:
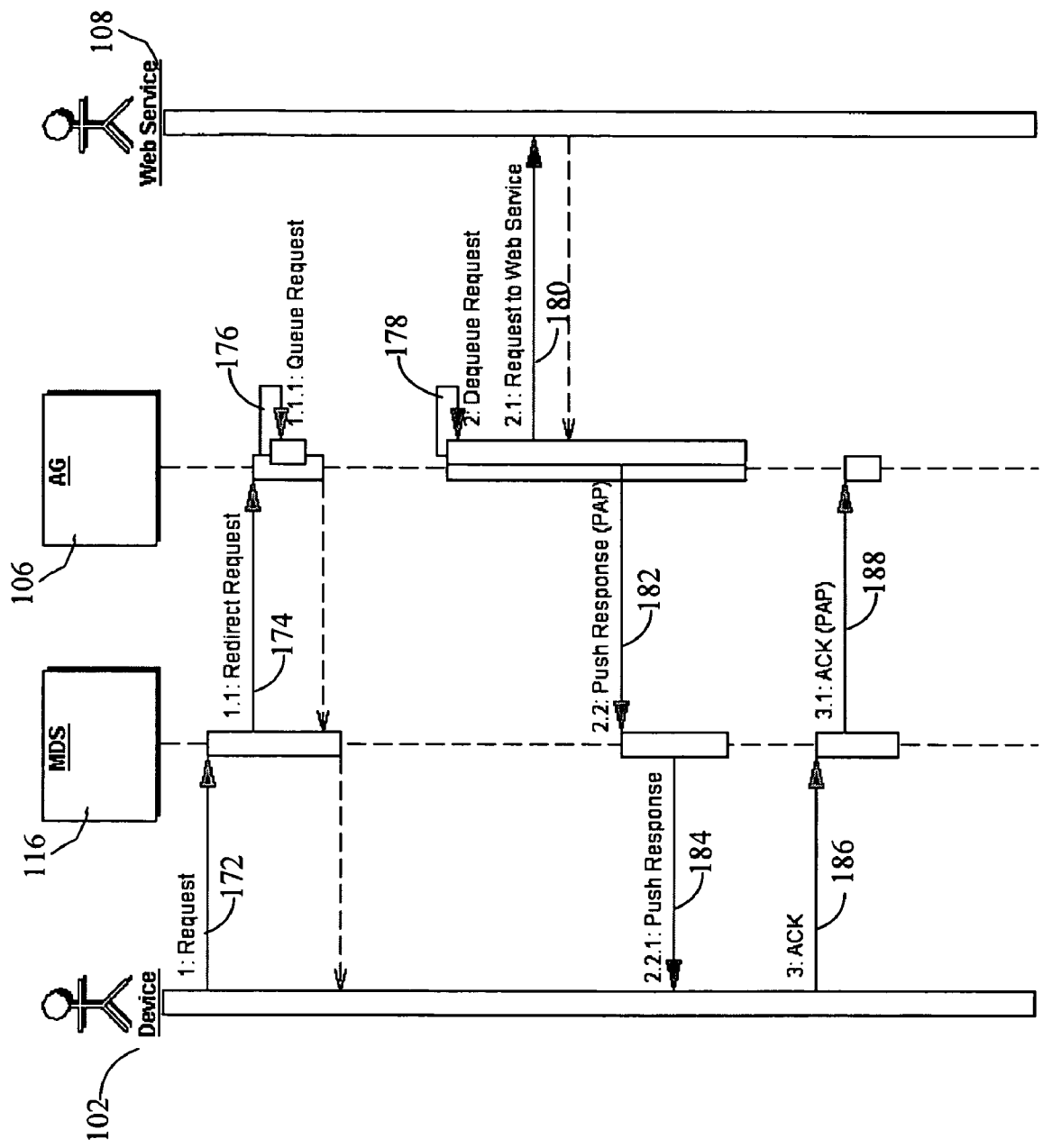
FIG. 3 shows in a sequence diagram an example of a communication sequence for the wireless component application model of FIG. 2.

Referring to FIG. 3 there is illustrated in a flow diagram an example of a communication sequence for the wireless component application communication model of FIG. 2. The diagram describes the communications sequence between the device 102 and the back-end service(s) 108:

a. Upon receiving a request 172 from the device 102, via 174 MDS 116, AG 106 queues the request 176 and releases the connection to the device.
b. Next, the request is retrieved from the queue 178, pre-processed and forwarded 180 to the Web Service 108 through a synchronous communication channel.
c. Any response from the previous request is processed by AG 106 and a response message is sent asynchronously 182 and 184 back to the device.

An application development tool generates an application bundle having the following structure:

Application Bundle Contents
Mobile Application Definition
Mobile Application Index of Data Sources
Mobile Application Data Source Definitions
Mobile Application Communication Mapping per Data Source
Mobile Application Connectivity Information (Service Descriptor) per Data Source Mobile Application Definition—The application definition is the XML representation of the application, containing a data model (data types), a visual model (screens, layouts, menus, controls), a communication model (messages) and other resources. The communication model of the application aggregates the use of various data sources on the server side. To the runtime environment, the application communication is uniformly handled as if it were with just one data source.

Mobile Application Index of Data Sources—This is a list of the Data Sources participating in the application. The list refers to the data source definitions also included in the bundle.

Mobile Application Data Source Definitions—The application bundle contains one definition per data source. This defines the data source communication model (external application programming interface (API)) and the data types used by it.

Mobile Application Communication Mapping—The application communication mapping defines the association between the application communication model and the data source communication model that is used in order to effectively transform wired network protocol communications into optimized (or improved) OTA communications suitable for the wireless application.

Mobile Application Connectivity Information (Service Descriptor)—The Service Descriptor contains information (e.g., credentials) used to connect to the data source in order to enable data flow (update data source, retrieve data from data source).

Data Source Mapping Loading Process—During application upload (installation) to a particular device, some portions of the application bundle are loaded by the server proxy and stored locally. The server proxy will later use this information at runtime, to serve the mobile application communication with the various data sources that it was built to communicate with.

Figure 4:
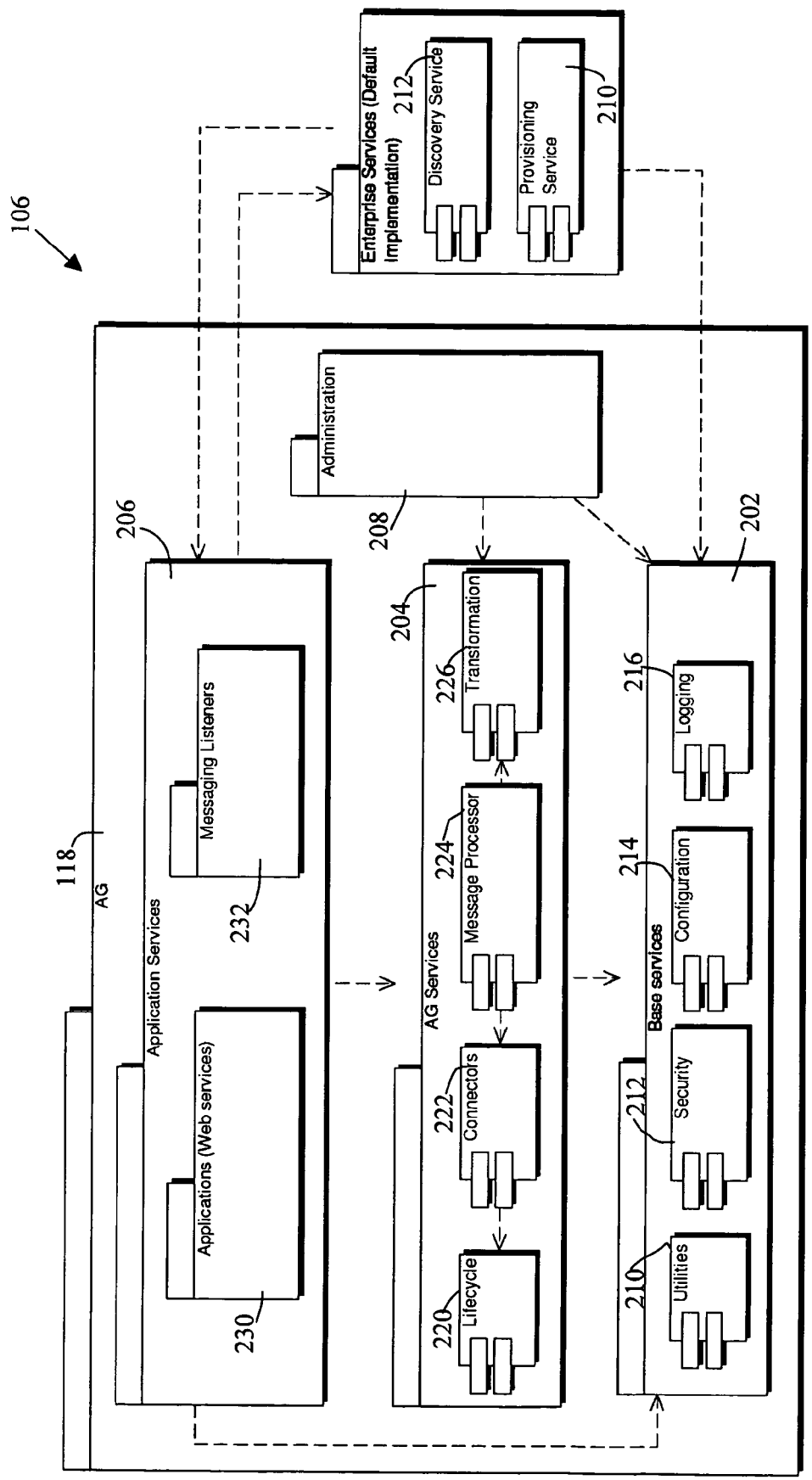
FIG. 4 shows in a detailed component diagram an example of the application gateway shown in FIG. 1.

Referring to FIG. 4, a more detailed view of an example of the application gateway 106 is shown. The application gateway server 118 includes three layers of service: a base services layer 202, an application gateway services layer 204 and an application services layer 206. The application gateway server 118 further includes an administration service 208.

A provisioning service 210 and a discovery service 212 are provided by the provisioning server 120 and the discovery server 120, respectively.

At the lowest level, the base services layer 202 offers basic, domain-independent system services to other components in higher levels. Thus, for example, subsystems in the application gateway services layer 204 and the application services layer 206 can utilize and collaborate with the subsystems in the base services layer 202. In the present embodiment, the base services layer 202 includes a utilities subsystem 210, a security subsystem 212, a configuration subsystem 214, and a logging subsystem 216.

The application gateway services layer 204 provides wireless component application domain-specific services. These services provide efficient message transformation and delivery to back-end services 108 and provide wireless device 102 and component application lifecycle management. In the present embodiment, the application gateway services layer 204 includes a lifecycle subsystem 220, a connector subsystem 222, a messaging subsystem 224, and a transformation subsystem 226.

The application services layer 206 sits at the top of the architecture and provides external program interfaces and user interfaces using subsystems provided by the lower layers. For example, various applications such as a service provider lifecycle application, a packaging application and a message listening application provide external program interfaces since they communicate primarily with applications on external systems. Similarly, an administration application provides a user interface by providing a user with the ability to access and potentially modify application gateway data and/or parameters.

The administration service 208 is responsible for administrative system messages, administration of the wireless devices 102, runtime administration of the application gateway subsystems, support and display system diagnostics, and administration of default implementations of the provisioning and discovery services.

The messaging listening application (or messaging listeners 232) provides an interface for receiving messages from the wireless devices 102 as well as external sources and forwarding them to the messaging subsystem. Further, the message listening application 232 typically authenticates that the source of the message is valid.

Figure 5:
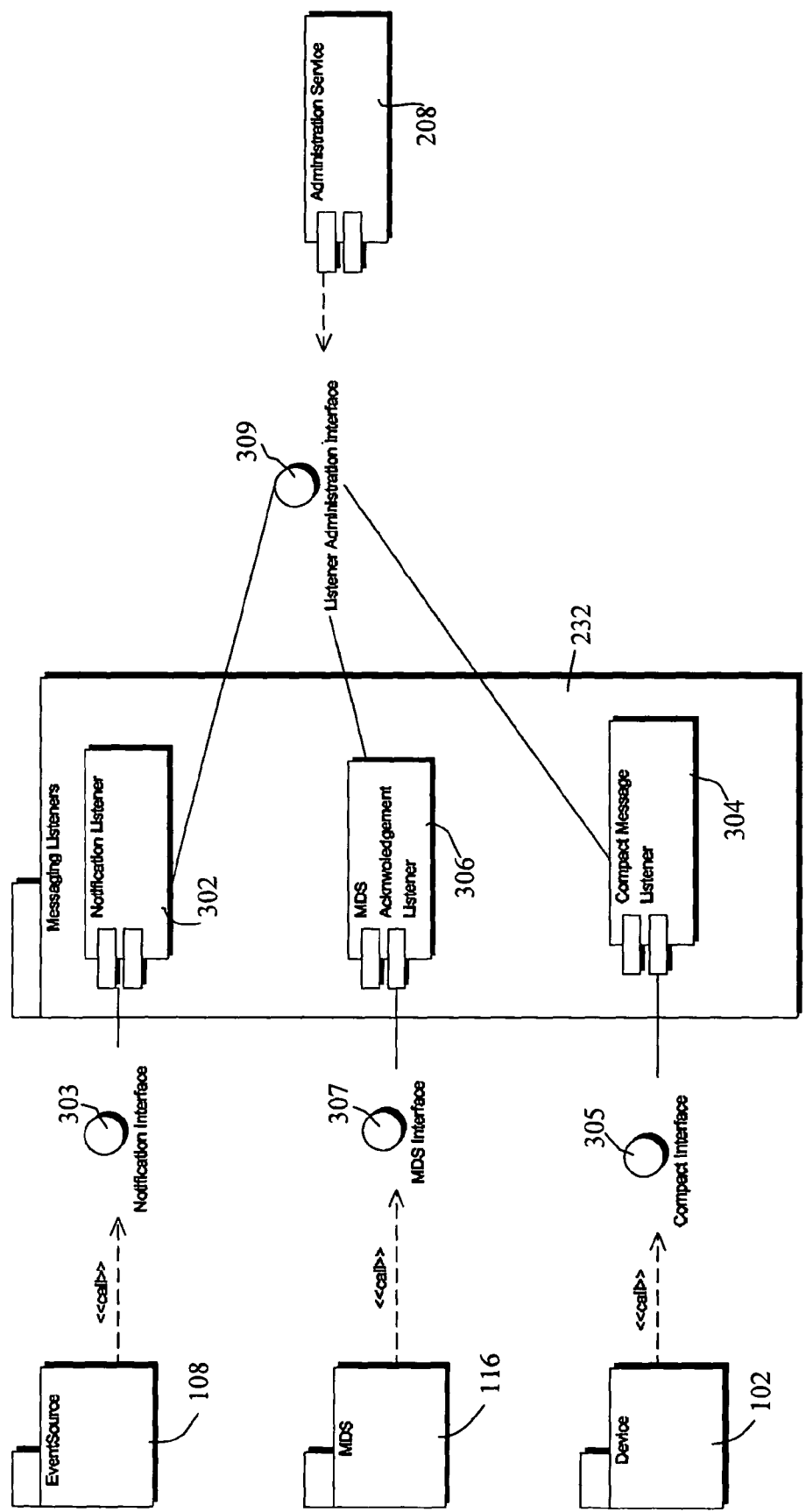
FIG. 5 shows in an interface diagram an example of a security subsystem.

Referring to FIG. 5, an example of the message listening application 232 is shown in greater detail. The message listening application 232 includes three listeners: a notification listener 302, a compact message listener 304, and a mobile data service acknowledgement listener 306. The notification listener 302 receives notification and response messages from event sources 108c via a notification interface 303. Other message listener interfaces may be added.

In one embodiment, the notification interface 303 may be implemented using Web Service (WS) Eventing. Web services often want to receive messages when events occur in other services, such as the event sources, and applications. A mechanism for registering interest is provided in the art by WS Subscription. WS Subscription defines a protocol for one Web service, referred to as a subscriber, to register interest with another Web service, referred to as an event source, for receiving messages about events, referred to as notifications. When the event source notifies the subscriber of an event, it is referred to as WS Eventing.

The compact message listener 304 receives messages from the mobile devices 102 via a compact message interface 305. The mobile data service acknowledgment listener 306 receives and acknowledges notifications from the mobile data service 116 via a mobile data service interface 307. Each of the three listeners 302, 304 and 306 receive administrative messages from the administration service 208 via a listener administrative interface 309.

In the present embodiment the listener interfaces 303, 305, 307, and 309 are configured using Hypertext Transfer Protocol/Hypertext Transfer Protocol over Secure Socket Layer (HTTP/HTTPS). However, these protocols have been selected as a design choice and other protocols may be used when desired. Accordingly, external systems transmit a HTTP/HTTPS request, which is received by the appropriate listener. The listener takes the message, makes minimal transformations, and forwards it to the messaging subsystem 224. The transformations include copying HTTP header information into message object fields. For example, the HTTP header information may identify the mobile data service 116 and wireless device 102 from which the message originated.

As previously described, the message listening application authenticates that the source of the message, be it the mobile data service 116, the wireless device 102 or event source 108, is valid.

Further, if reliable messaging is required, service availability is ensured and the listeners deal with solutions to availability attacks. In order to facilitate this, the messaging subsystem defines a threshold for a maximum number of messages and connections for a given time period from any back-end service 108, component application or wireless device. The administrator can modify this threshold as desired, as well as allow for specific exceptions via the administration service 208.

Further, since message interception and replay attack is possible, the listeners detect and prohibit this attack using mechanisms that identify replayed messages. These mechanisms typically include the use of a nonce. A nonce is defined as a parameter that varies with time. A nonce can be a timestamp or other special marker intended to limit or prevent the unauthorized replay or reproduction of a message. Because a nonce changes with time, it can be used to determine whether or not a message is original, or a replay or reproduction of the original message. The use of a nonce for preventing interception and replay attacks is known in the art and need not be described in detail, as standard implementations are utilized.

Further, other technologies, such as sequencing, can also be used to prevent replay of application messages in addition to, or in lieu of, the time timestamp technique. Once again, such techniques are known in the art and need not be described in detail, as standard implementations are utilized.

Figure 6:
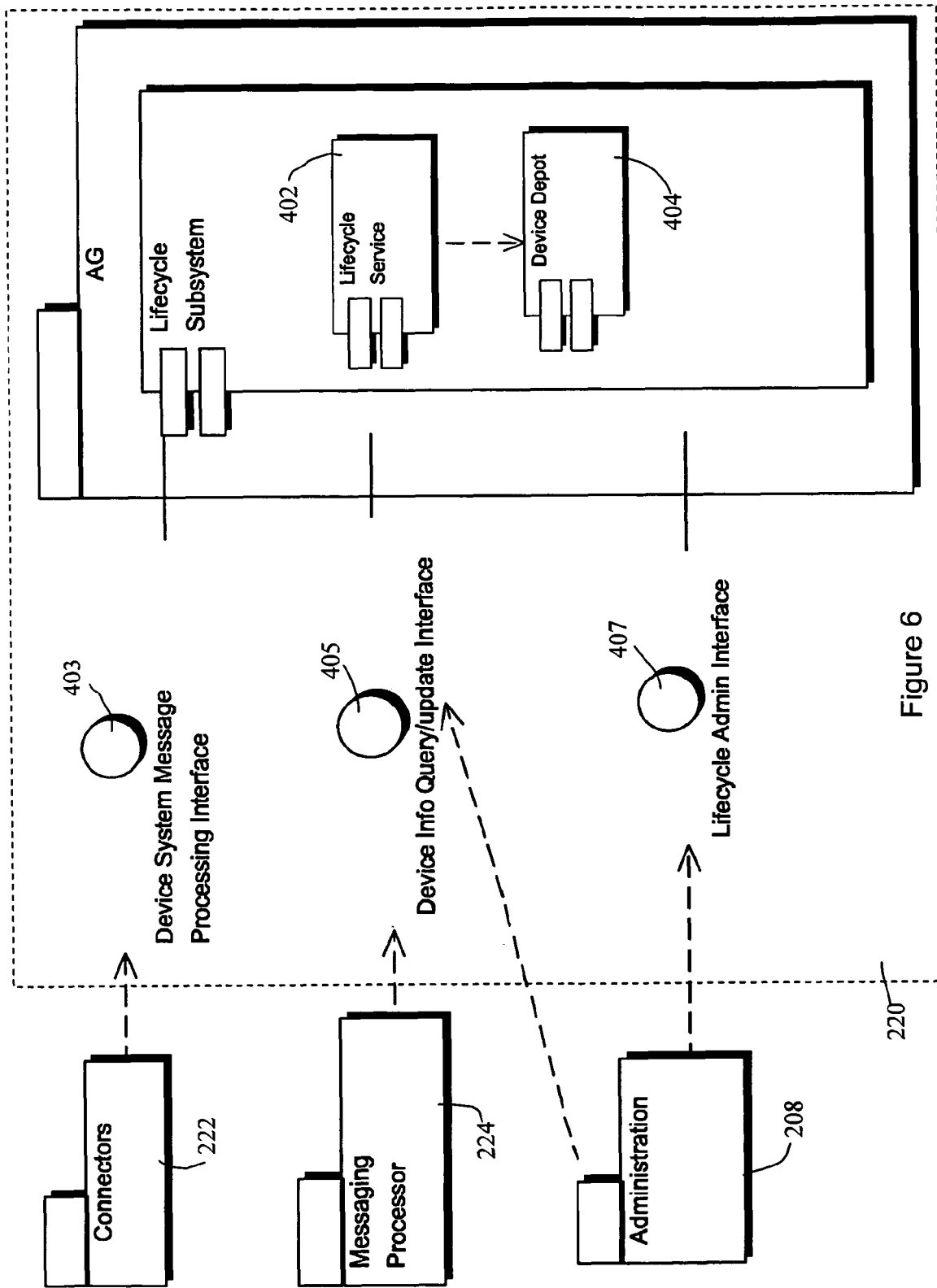
FIG. 6 shows in an interface diagram an example of the lifecycle subsystem in greater detail.

Referring to FIG. 6, an example of the lifecycle subsystem 220 is shown in greater detail. The lifecycle subsystem includes a lifecycle service 402 and a device depot 404.

The lifecycle service 402 processes device initiated messages that relate to the wireless device 104, the runtime environment lifecycle and the component application lifecycle. Such messages, for example, may relate to a wireless device registration or suspension, wireless device swap, wireless device availability, a component application installation, upgrade, or deletion, and runtime environment upgrades. These messages are communicated to and from the connector subsystem 222 via a device system message processing interface 403.

The lifecycle service 402 further provides the ability to query for wireless devices and component application using various filters. In order to facilitate this feature, the lifecycle service 402 communicates with the messaging subsystem 224 and the administration subsystem 208 via a device information query/update interface 405. In the present embodiment, the device information query/update interface 405 is implemented using a set of Java application program interfaces (APIs) for querying and updating device information. Typical interfaces include those for managing the wireless device's security and client administration policy.

The lifecycle subsystem 220 manages a security profile for each wireless device 104 registered with the application gateway 106 in the device depot 404. Each security profile includes a secure symmetric key for each device. This key is used for secure communication between the wireless device 104 and application gateway 106.

The client administration policy includes retrieving wireless device status, searching for component applications satisfying certain modifiable criteria, and searching for devices satisfying certain modifiable criteria. For example, it may be desirable to determine which component applications are installed on all the wireless devices or which wireless devices have a specific component application installed.

Yet further, a lifecycle administration interface 407 is provided for facilitating the management of the lifecycle subsystem 402 and the device depot 404 by the administration subsystem 208. For example, the administration subsystem can indicate the availability of a new version of a component application or the runtime environment.

Accordingly, the lifecycle service 402 manages the status of each of a plurality of assigned wireless devices 102, including the runtime environment and component applications stored therein. Information such as the runtime environment, component application status, and the wireless device security settings are stored in the lifecycle depot. The security settings may include, for example, client administration policy and the wireless device's encryption key.

The application gateway server 118 also allows for the use of third party lifecycle components, also referred to as lifecycle service providers, which are typically external to the application gateway 106. In order to facilitate lifecycle service providers, lifecycle service provider listeners are provided at the application services layer. The lifecycle service provider listeners are responsible for receiving notification on all lifecycle system messages from the lifecycle service providers and transmitting them to the administration subsystem 208 for processing. Further, the lifecycle service providers can access the administration service to configure the application gateway server 118 or send system messages.

Figure 7:
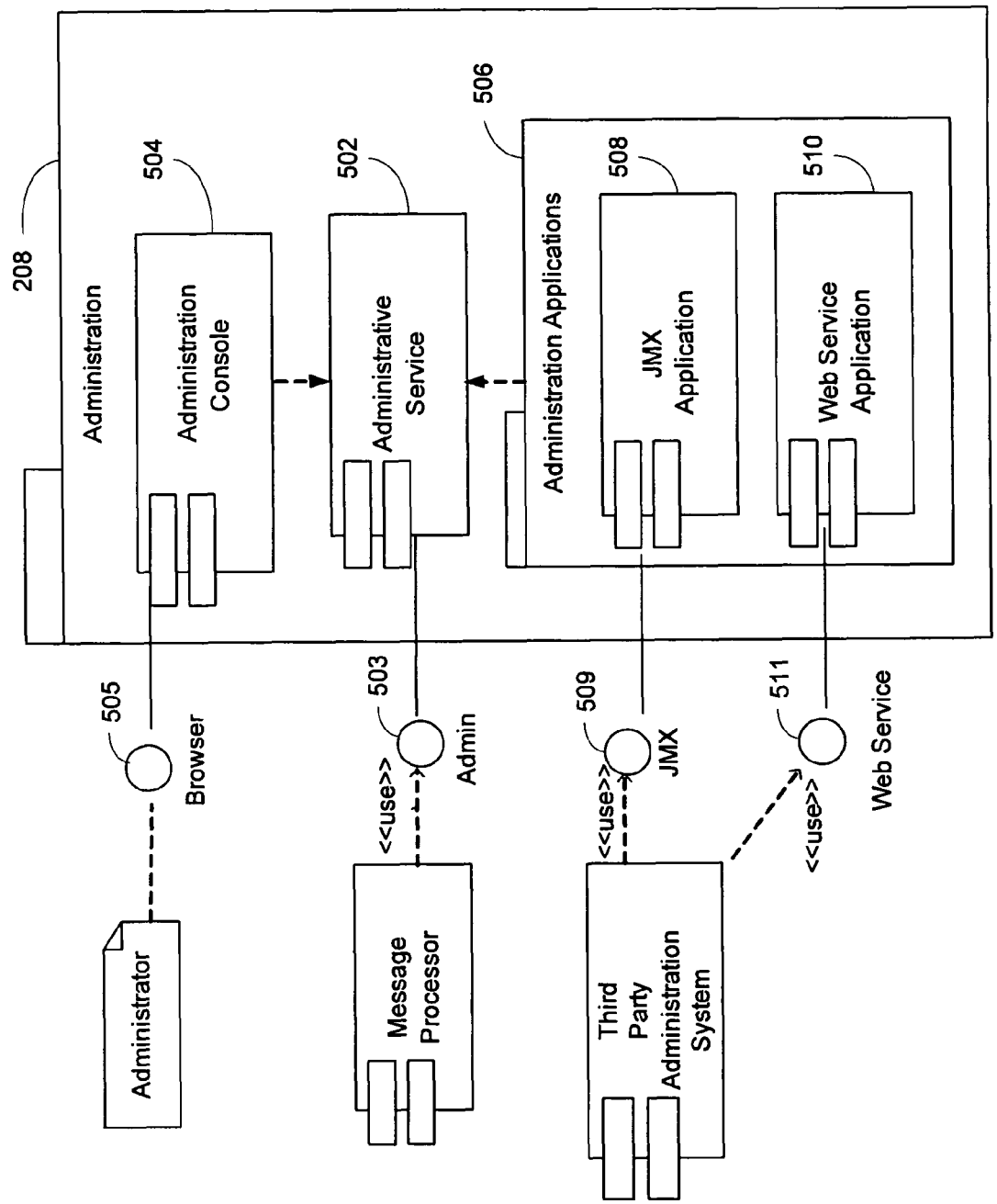
FIG. 7 shows in an interface diagram an example of the administration subsystem in more detail.

The administration subsystem 208 administers system messages, system devices, application gateway subsystems, system diagnostics, and default implementations of the provisioning and discovery services. Referring to FIG. 7, a more detailed view of an example of the administration subsystem 208 is shown. The administration subsystem 208 includes an administration service 502, an administration console 504 and administration applications 506. The administration applications 506 include a Java Management Extension (JMX) application 508 and a Web service application 510.

A browser interface 505 couples an administrator with the administrator console 502 for administrating the application gateway 106. An administrator interface 503 couples the administration service 502 with the messaging subsystem 224 for delivering administrative system messages. The administration applications 506 are coupled to their respective third party administrative applications via an appropriate interface. For example, the JMX application 508 is coupled via a JMX interface 509 and the Web service application 510 is coupled via a Web service interface 511.

The administration service 502 processes component application and runtime environment lifecycle events initiated by the administrator or the lifecycle service providers through the lifecycle administration interface. Examples of such events include installing a component application using push provisioning, refreshing the encryption key, upgrading the component application or runtime components, removing component applications, quarantining component applications and removing component applications from quarantine, applying component application cleanup script, querying the runtime environment for a status update, and updating the client administration policy.

The administration service 502 is also responsible for administration of the wireless devices 104. Accordingly, the administration service 502 is capable of responding to wireless device registration system messages and maintaining wireless device settings such as the security key, mobile data service URL, runtime version and status. The administration service 502 further supports the ability to list devices in accordance with predefined filter characteristics, such as querying a device for its component application and runtime environment settings and querying for component applications on specific devices.

The administration service 502 also provides the administrator with the ability to access application gateway subsystems runtime information and settings, per cluster node if applicable, and perform system-related tasks. Such tasks include viewing the message subsystem 224 runtime information, including message information per wireless device 12 and per component application, as well as the number of messages in queue, and a snapshot of the number of pooled objects of specific type. The administrator is able to modify specific settings at runtime as well as delete or reschedule expired messages.

Other information and settings provided by the administration service 502 include the following. The application gateway subsystem parameters are available for modification. Therefore, for example, the administrator can enable and disable various features at runtime. Database settings can be configured for a centralized application gateway database. This database may include all of the subsystem depots. The application gateway URLs can be configured to be accessible to external systems. For example, a URL may be assigned to the administration application 506 to allow access by third parties. Also a URL may be assigned to the packaging application to allow access by the provisioning service.

The administration service 502 may also store discovery service credentials, service provider credentials, mobile data service parameters and security parameters. The discovery service credentials can be used to authenticate the discovery service upon receiving a notification message that a component application is available. Similarly, service provider credentials, including its URL, can be used to authenticate a service provider upon receiving component application or runtime environment lifecycle messages. Mobile data service parameters can be used to connect the administrator to the mobile data service and include its IP address, user identification and password. The application gateway security parameters and settings, such as the application gateway public and private key and key refreshing policy, are used for encrypting communication between the application gateway and external applications.

The administration service 502 is also used for registering additional subsystems such as custom connectors and lifecycle listeners, for example.

The Web service application 510 uses Web services for directing service provider initiated system messages to the administration service 502 for processing and delivery to device, if required.

Similarly, the JMX application 508 directs service provider-initiated system messages to the administration service 502 for processing and delivery to device, if required. However, the JMX interface 509 is an open interface that any management system vendor can leverage. The administration infrastructure is based on JMX technology, which is an open technology for system management and monitoring. Each management system implements a set of Mbeans objects in order to be configurable. These objects are registered with an MbeanServer running in the process space of the object, in accordance with JMX specification.

Since the application gateway 106 can potentially run in a distributed environment, that is some subsystems may run on different application servers, then each application server needs to have its own implementation of the MbeanServer. Further, each subsystem needs to be configured using a separate Administration Console provided by the corresponding application server, or using third party console that knows how to access the functionality provided by MbeanServer.

A runtime environment framework container is a client-resident container within which applications are executed on a device. The container manages the application lifecycle on the device (provisioning, execution, deletion, etc.) and is responsible for translating the metadata (XML) representing an application into an efficient executable form on a device. The container provides a set of services to the application, as well as providing support for optional JavaScript. These services include support for UI control, data persistence and asynchronous client-server messaging, etc.

Figure 8:
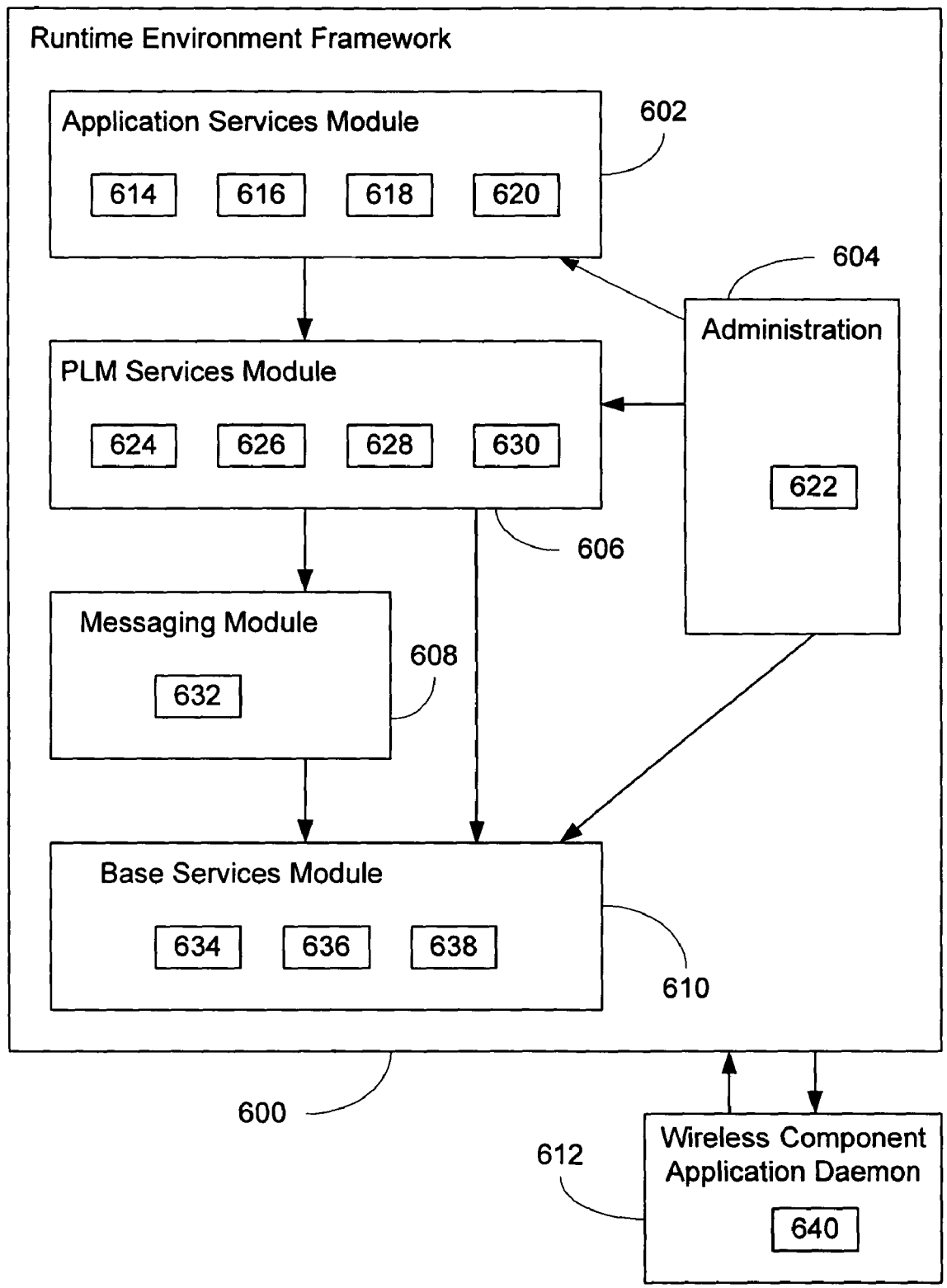
FIG. 8 shows in a component diagram an example of a runtime environment structure of the wireless component application.

FIG. 8 shows an example of a runtime environment framework 600. The runtime environment framework 600 comprises an application services module 602, an administration module 604, a provisioning and lifecycle management (PLM) services module 606, a messaging module 608, and a base services module 610. Components may be removed or added to the runtime environment framework 600. The runtime environment framework 600 communicates with a wireless component application daemon 612.

The application services module 602 includes a screen service 614 for providing an interface between currently running applications and a user, an interpreter service 616 for providing an execution environment for the applications, a metadata service 618 for handling and mediating application metadata related access, and an access service 620 for allowing applications to access other applications on the device 102.

The administration module 604 includes a control center 622 for handling a user interface of the wireless component application runtime environment framework 600, processing user interaction with the wireless component application runtime environment framework 600, and for integrating the wireless component application runtime environment framework 600 with the network system 100.

The PLM services module 606 includes a RE container 624 for coordinating RE container upgrades and backup/restore processes and for implementing a default error handling mechanism for the RE framework 600, a discovery service module 626 for locating applications in an application repository, a provisioning service 628 for application provisioning (including application downloads, installation and upgrades), and a lifecycle service 630 for registering, maintaining information for, and administrating applications.

The messaging module 608 includes a messaging service module 632 for message queuing, message (de)compacting, and message distribution.

The base services module 610 includes a persistence service 634 for storing a RE profile (including its version, directory, client administration policy, application administration policies, security keys, available upgrades, etc.), storing an application profile (including its version, metadata, application persistence data components, application persistable global data and application resource, available upgrades, etc.), and storing reliable messages (including outgoing messages pending delivery due to out of coverage, and incoming reliable messages pending processing). The base services module 610 also includes a security service 636 for restricting access to RE services, providing message authentication, integrity, and encryption. The base services module 610 also includes a communication service 638 for sending and receiving messages in and out of the device 102, downloading resources and files from appropriate repositories, and notifying interested RE services about wireless coverage events.

The wireless component application daemon module 612 includes a daemon 640 for restarting the wireless component application process whenever it stops due to a fatal exception.

Figure 9:
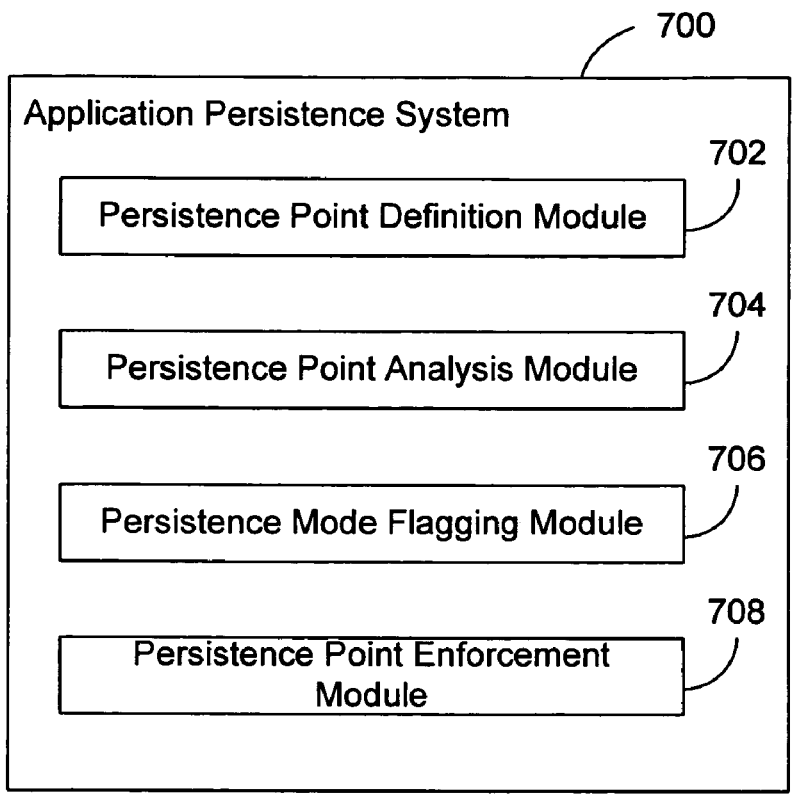
FIG. 9 shows in a component diagram an example of an application persistence system for improving wireless application resource efficiency, in accordance with an embodiment of the present patent disclosure.

FIG. 9 shows an example of an application persistence system 700 for improving wireless application resource efficiency, in accordance with an embodiment of the present patent disclosure. When improving efficiency, reliability may be sacrificed in favor of performance. (Conversely, reliability improves data integrity at a cost to performance.) The application persistence system 700 comprises a persistence-point definition module 702 for loading conditions that trigger persisting application data, a persistence-point analysis module 704 for identifying efficient and reliable persistence points and a persistence-point enforcement module 706 for enforcing persistence points at application runtime. The application persistence system 700 may be implemented in the persistence service 634.

The application persistence system 700 addresses a way of improving a container-based wireless application by introducing two modes of persistence support: efficient and reliable. The application persistence system 700 can be applied on any software platform but is particularly practical for wireless device where low processing speeds and slow persisting memory are common.

Figure 10:
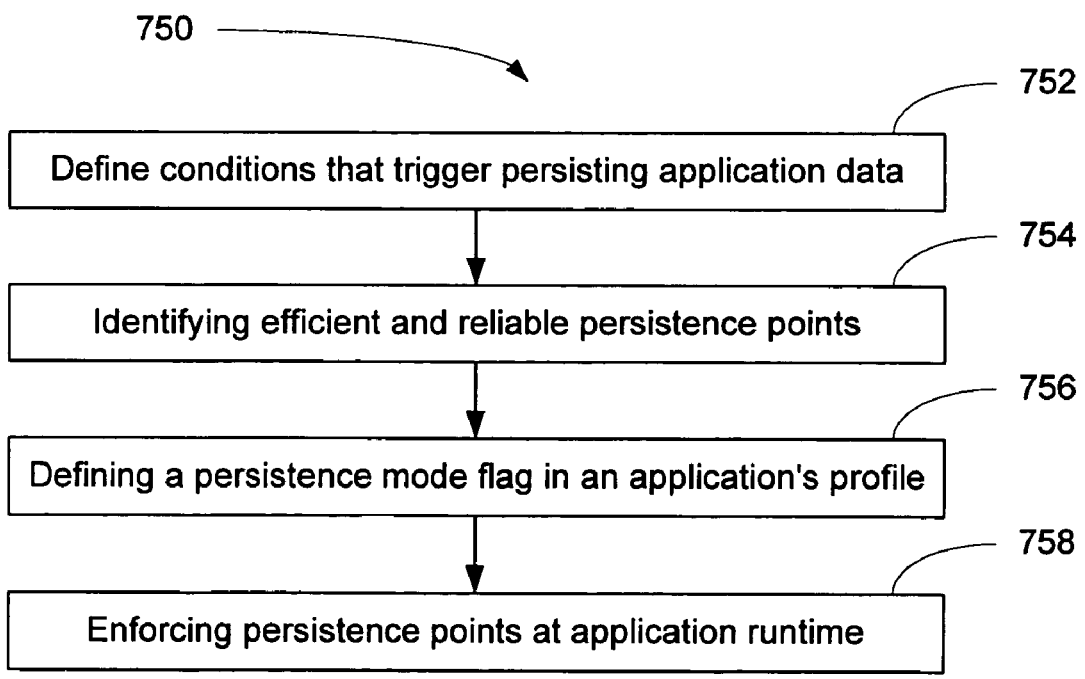
FIG. 10 shows in a flowchart an example of a method of improving wireless application resource efficiency, in accordance with an embodiment of the application persistence system.

FIG. 10 shows in a flowchart a method of improving wireless application resource efficiency (750), in accordance with an embodiment of the application persistence system 700. The method (750) includes the steps of defining conditions that trigger persisting application data (752), identifying efficient and reliable persistence points (754), defining a persistence mode flag in an application's profile (756), and enforcing persistence points at application runtime (758). Preferably, control over the persistence mode is enforced by an application container rather than by every individual application.

The first step in the method (750) is to define conditions that will trigger persisting application data (752). Depending on the particular implementation, these conditions can either be predefined by the application container, or the developer of the wireless application can be provided with programmatic means to define such points. Examples of conditions for persistence points include: user navigates to a new application screen, user clicks on a button on the screen, an incoming message is received, and an application is closed. The more persistence points are defined, the greater the reliability that can be provided by the reliable mode of persistence.

Reliable mode of execution of an application is when data is persisted on all persistence points—both reliable and efficient. An application should run in reliable mode where avoiding data loss is important. By contrast, in efficient mode of execution of an application, data is persisted only when an efficient persistence point is used; reliable persistence points are ignored in order to improve application performance. Where losing data is not as important as performance and user experience, applications should run in efficient mode. Efficient points are points in the application workflow where data has to be persisted when running in both reliable and efficient mode. Reliable points are points in the application workflow where data has to be persisted when running in both reliable and efficient mode.

Unlike regular applications where data is persisted at strictly predefined moments (for example, when a user clicks a SAVE menu item), for wireless applications an additional level of flexibility is introduced. Depending on the importance that is put on data persistence a wireless application can run in one of the two modes: reliable or efficient. In both modes there is a trade off. In efficient mode reliability is sacrificed in favor of performance. Reliable mode improves data integrity at a cost to performance.

After persistence points have been defined (752) each point is identified as efficient or reliable (754). Efficient persistence points will be considered during both modes of operation, and data will be instantly persisted when the execution of the application reaches an efficient persistence point. In order to ensure that applications which are running in efficient mode are not accessing persistent memory (e.g., flash) too frequently, efficient points should be chosen so that data is persisted only if it is needed by the application logic—e.g., on application exit.

Reliable persistence points are those that will be considered only if the application is running in reliable mode. In order to reduce the risk of data loss, reliable persistence points should guarantee that data is persisted as close to the point of it's modification as possible.

In order to take advantage of the persistence points an application flag is defined (756) for each application executed in the application container. This flag for example can be part of application's profile or another repository.

Figure 11:
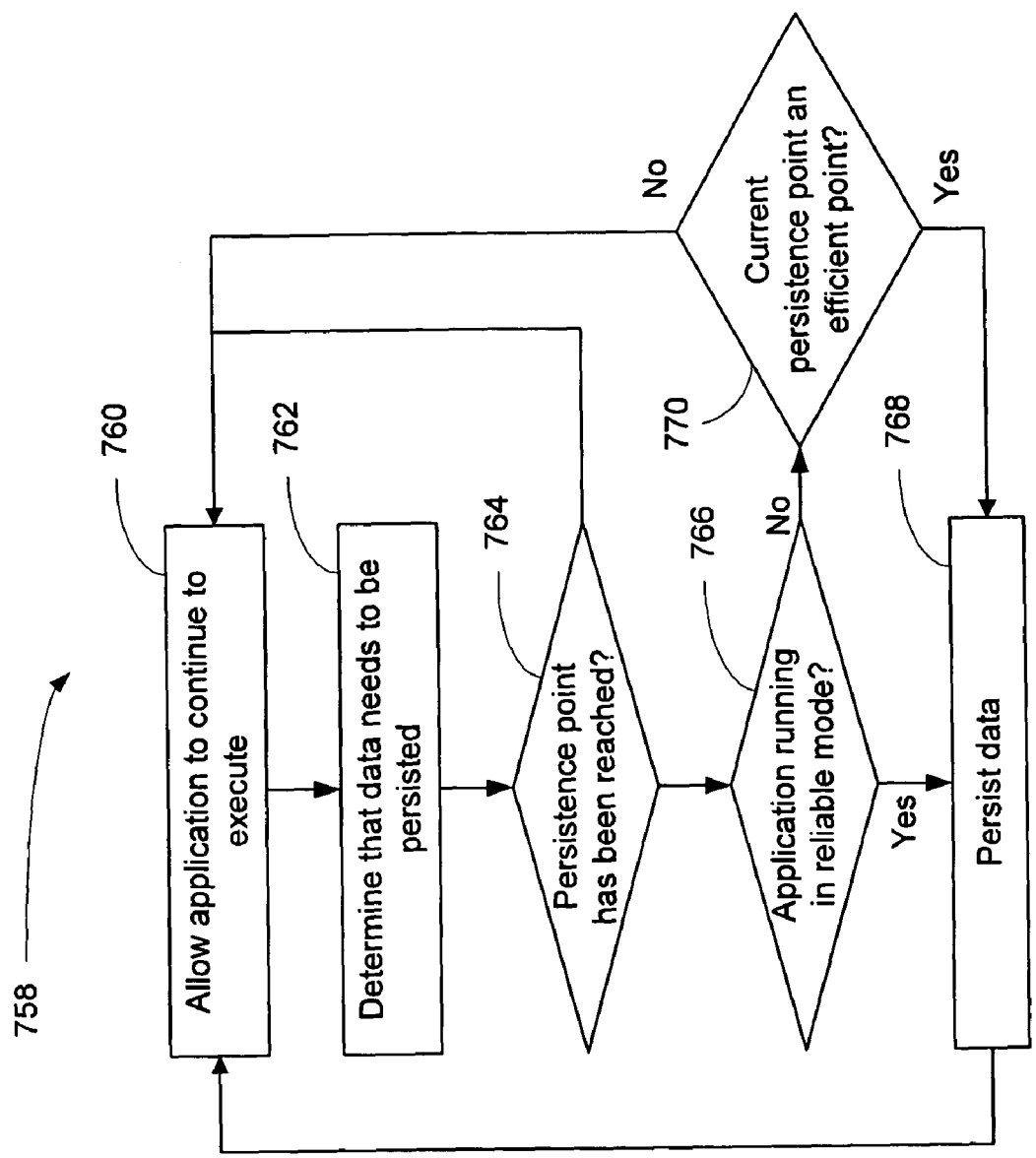
FIG. 11 shows in a flowchart an example of a method of enforcing persistence points during application runtime, in accordance with an embodiment of the application persistence system.

Preferably, the application container is responsible for enforcing persistence points during application runtime (758), depending on application's persistence mode. FIG. 11 shows in a flowchart an example of a method of enforcing persistence points during application runtime (758), in accordance with an embodiment of the application persistence system 700. The method (758) begins with the application in execution (760). Once data needs to be persisted (762) then a determination is made as to whether a persistence point of the application has been reached (764). If not (764), the method returns to allowing the application to continue to execute (760). If so (764), then a determination is made as to whether the application is running in reliable mode (766), using the application flag in the application's profile. If so (766), the data is persisted (768), and the method returns to allowing the application to continue to execute (760). Once it is determined that data needs to be persisted (the appropriate persistence point has been reached) all changed data is persisted in a manner known in the industry, for example, using flash memory or file system. If the application is not running in reliable mode (766), then a determination is made as to whether the current persistence point is an efficient point (770). If so (770), the data is persisted (768), and the method returns to allowing the application to continue to execute (760). If not (770), the application is allowed to continue to execute (760). When an efficient persistence point is reached by the application, data is persisted both in efficient and reliable modes (unlike the situation when a reliable point is reached, where data is persisted only if the application is running in reliable mode).

The steps in FIG. 11 (which are step (758) from FIG. 10) are performed by the enforcement module 708 using the information provided by other modules in 752, 754, and 756. FIG. 11 is the part of the method that is being applied at application runtime. Steps 752, 754, and 756 prepare the information used in step 708.

Advantageously, the application persistence system and method optimize efficiency and reliability of wireless application device resources. Additional advantages include better user experience (since time-consuming data persistence is postponed for later execution), and battery life improvements (since the frequency of data persistence is decreased).

The application persistence system and methods according to the present patent disclosure may be implemented by any hardware, software or a combination of hardware and software having the above described functions. The software code, either in its entirety or a part thereof, may be stored in a computer-readable memory. Further, a computer data signal representing the software code which may be embedded in a carrier wave may be transmitted via a communication network. Such a computer-readable memory and a computer data signal are also within the scope of the present patent disclosure, as well as the hardware, software and the combination thereof.

While particular embodiments of the present patent disclosure have been shown and described, changes and modifications may be made to such embodiments without departing from the true scope of the patent disclosure.

What is claimed is:

1. A method of persisting application data in memory of a wireless device, the method comprising:
   predefining one or more persistence points of an application prior to executing the application;
   executing the application in a reliable persistence mode or an efficient persistence mode based on a persistence-mode flag of the application, the one or more persistence points triggered when predefined conditions occur during execution of the application, each of the one or more persistence points being a reliable persistence point or an efficient persistence point;
   determining that a persistence point of the one or more persistence points of the application has been reached in the execution of the application;
   persisting application data to the memory when it is determined that a reliable or efficient persistence point has been reached and the application is executing in the reliable persistence mode; and
   persisting application data to the memory when it is determined that an efficient persistence point has been reached and the application is executing in the efficient persistence mode;
   wherein the reliable persistence mode of execution of the application is when data is persisted on all persistence points and the efficient persistence mode of execution of the application is when data is persisted only when the efficient persistence point is used.

2. The method as claimed in claim 1, further comprising:
   defining the persistence-mode flag in a profile of the application.

3. The method as claim in claim 1, wherein predefining is implemented by an application container.

4. The method as claim in claim 1, wherein predefining is implemented by a developer of the application.

5. A computer-readable memory storing instructions or statements for providing a method of persisting application data in a wireless device, the method for execution by a processor comprising:
   predefining the one or more persistence points of an application prior to executing the application;
   executing the application in a reliable persistence mode or an efficient persistence mode based on a persistence-mode flag of the application, the one or more persistence points triggered when predefined conditions occur during execution of the application, each of the one or more persistence points being a reliable persistence point or an efficient persistence point;
   determining that a persistence point of the one or more persistence points of the application has been reached in the execution of the application;
   persisting application data to the memory when it is determined that a reliable or efficient persistence point has been reached and the application is executing in the reliable persistence mode; and
   persisting application data to the memory when it is determined that an efficient persistence point has been reached and the application is executing in the efficient persistence mode;
   wherein the reliable persistence mode of execution of the application is when data is persisted on all persistence points and the efficient persistence mode of execution of the application is when data is persisted only when the efficient persistence point is used.

6. An application persistence system for persisting application data in memory of a wireless device, the application persistence system comprising:
   a persistence-point definition module for predefining one or more persistence points prior to executing an application;
   a persistence-point analysis module for identifying each of one or more persistence points of the executing application as an efficient persistence point or a reliable persistence point, each of the one or more identified persistence points triggering enforcement of the persistence point when predefined conditions occur in the execution of the application; and
   a persistence-point enforcement module for enforcing each of the one or more persistence points at application runtime based on the identified persistence point and the execution mode of the application, the execution mode specified by a persistence-mode flag of the application, the enforcement of the one or more persistence points comprising:
   persisting application data when to the memory when it is determined that a reliable or efficient persistence point has been reached and the application is executing in the reliable persistence mode; and
   persisting application data to the memory when it is determined that an efficient persistence point has been reached and the application is executing in the efficient persistence mode;
   wherein the reliable persistence mode of execution of the application is when data is persisted on all persistence points and the efficient persistence mode of execution of the application is when data is persisted only when the efficient persistence point is used.

7. The system as claimed in claim 6, wherein the persistence-point enforcement module includes:
   means for executing the application; and
   means for determining if a persistence point of an application has been reached.

8. The system as claimed in claim 7, wherein the means for determining includes:
   means for receiving notification that data needs to be persisted.

* * * * *